US011805418B2

(12) United States Patent
Kaushik et al.

(10) Patent No.: US 11,805,418 B2
(45) Date of Patent: Oct. 31, 2023

(54) SYSTEM AND METHOD FOR LOCATION-BASED ENDPOINT SECURITY

(71) Applicant: SOPHOS LIMITED, Oxfordshire (GB)

(72) Inventors: Anil Kaushik, Karnataka (IN); Sathwikh Gopady Narasimha, Karnataka (IN)

(73) Assignee: Sophos Limited, Oxfordshire (GB)

( * ) Notice: Subject to any disclaimer, the term of this patent is extended or adjusted under 35 U.S.C. 154(b) by 207 days.

(21) Appl. No.: 16/569,606

(22) Filed: Sep. 12, 2019

(65) Prior Publication Data

US 2020/0092716 A1   Mar. 19, 2020

(30) Foreign Application Priority Data

Sep. 13, 2018  (IN) .............................. 201811034593

(51) Int. Cl.
*H04W 12/37*  (2021.01)
*H04W 12/63*  (2021.01)
*H04W 12/79*  (2021.01)
*H04W 12/122* (2021.01)

(52) U.S. Cl.
CPC ......... *H04W 12/37* (2021.01); *H04W 12/122* (2021.01); *H04W 12/63* (2021.01); *H04W 12/79* (2021.01)

(58) Field of Classification Search
CPC ..... H04W 12/37; H04W 12/63; H04W 12/79; H04W 12/122
See application file for complete search history.

(56) References Cited

U.S. PATENT DOCUMENTS

| 11,076,051 B1* | 7/2021 | Miskovic ............ H04L 65/1063 |
| 2008/0240083 A1* | 10/2008 | Feldman ................. H04L 12/66 370/352 |
| 2009/0310546 A1 | 12/2009 | Gopinath et al. |
| 2012/0166582 A1* | 6/2012 | Binder .................. G06F 21/602 709/217 |
| 2012/0309427 A1 | 12/2012 | Harvey et al. |
| 2013/0097710 A1* | 4/2013 | Basavapatna ......... G06F 21/577 726/25 |
| 2013/0347058 A1* | 12/2013 | Smith ..................... G06F 21/57 726/1 |
| 2017/0318023 A1* | 11/2017 | Seed ..................... H04L 63/105 |

OTHER PUBLICATIONS

"First Examination Report in Indian Application No. 201811034593", dated Dec. 31, 2020, 6 Pages.

* cited by examiner

*Primary Examiner* — Lynn D Feild
*Assistant Examiner* — Vladimir I Gavrilenko
(74) *Attorney, Agent, or Firm* — IP Spring

(57) ABSTRACT

Methods, systems and computer readable media for location-based endpoint security are described.

18 Claims, 6 Drawing Sheets

SYSTEM AND METHOD FOR LOCATION-BASED ENDPOINT SECURITY

TECHNICAL FIELD

Embodiments relate generally to wireless computer networks, and more particularly but not exclusively, to methods, systems and computer readable media for location-based endpoint security.

BACKGROUND

Devices that can access networks via wired or wireless connections have proliferated. As a consequence, the variety of threats, devices, applications, and communication protocols has also increased. Implementing and maintaining effective security policies in dynamic and rapidly changing network environments can be a challenge for users.

SUMMARY

In general, some implementations may include a system configured to provide and manage location-based endpoint security.

One or more embodiments may include methods, systems and computer readable media for location-based endpoint security. Some implementations may include a method. The method may include receiving, at an endpoint device, access point location information for one or more access points. The method can also include determining, at the endpoint device, an endpoint location of the endpoint device based on the access point location information and signal characteristics of wireless signals received by the endpoint device from at least one of the one or more access points. The method can further include applying, at the endpoint device, one or more data communication policies based on the endpoint location and the access point location information.

In some implementations, the method can also include providing, by the endpoint device, the endpoint location to the one or more access points. In some implementations, the access point location information can include a latitude and longitude for respective ones of the one or more access points. In some implementations, determining the endpoint location can include performing a triangulation operation using the signal characteristics of the wireless signals.

In some implementations, determining the endpoint location can include determining a radio frequency fingerprint for the wireless signals received by the endpoint device. In some implementations the one or more data communications policies can include permitting one or more applications executing on the endpoint device to perform data communications with at least one of the one or more access points.

In some implementations, the one or more data communications policies can include restricting, using the endpoint device, one or more applications executing on the endpoint device from performing data communications with at least one of the one or more access points. In some implementations, the one or more data communications policies can include selectively permitting data communications from one or more applications executing on the endpoint device based on the endpoint location and a time of the data communications.

Some implementations can include a threat management system comprising one or more processors, and a nontransitory computer readable medium coupled to the one or more processors, the nontransitory computer readable medium having stored thereon software instructions that, when executed by the one or more processors, causes the one or more processors to perform operations.

The operations can include receiving, at an endpoint device, access point location information for one or more access points. The operations can also include determining, at the endpoint device, an endpoint location of the endpoint device based on the access point location information and signal characteristics of wireless signals received by the endpoint device from at least one of the one or more access points. The operations can further include applying, at the endpoint device, one or more data communication policies based on the endpoint location and the access point location information.

In some implementations, the operations can further include providing, by the endpoint device, the endpoint location to the one or more access points. In some implementations, the access point location information can include a latitude and longitude for respective ones of the one or more access points. In some implementations, determining the endpoint location can include performing a triangulation operation using the signal characteristics of the wireless signals.

In some implementations, determining the endpoint location can include determining a radio frequency fingerprint for the wireless signals received by the endpoint device. In some implementations, the one or more data communications policies can include permitting one or more applications executing on the endpoint device to perform data communications with at least one of the one or more access points.

In some implementations, the one or more data communications policies can include restricting, using the endpoint device, one or more applications executing on the endpoint device from performing data communications with at least one of the one or more access points.

In some implementations, the one or more data communications policies can include selectively permitting data communications from one or more applications executing on the endpoint device based on the endpoint location and a time of the data communications.

Some implementations can include a nontransitory computer readable medium having stored thereon software instructions that, when executed by one or more processors, causes the one or more processors to perform operations.

The operations can include receiving, at an endpoint device, access point location information for one or more access points. The operations can also include determining, at the endpoint device, an endpoint location of the endpoint device based on the access point location information and signal characteristics of wireless signals received by the endpoint device from at least one of the one or more access points. The operations can further include applying, at the endpoint device, one or more data communication policies based on the endpoint location and the access point location information.

In some implementations, the operations can further include providing, by the endpoint device, the endpoint location to the one or more access points. In some implementations, the access point location information can include a latitude and longitude for respective ones of the one or more access points. In some implementations, determining the endpoint location can include performing a triangulation operation using the signal characteristics of the wireless signals.

In some implementations, determining the endpoint location can include determining a radio frequency fingerprint for the wireless signals received by the endpoint device. In some implementations, the one or more data communications policies can include permitting one or more applications executing on the endpoint device to perform data communications with at least one of the one or more access points.

In some implementations, the one or more data communications policies can include restricting, using the endpoint device, one or more applications executing on the endpoint device from performing data communications with at least one of the one or more access points.

In some implementations, the one or more data communications policies can include selectively permitting data communications from one or more applications executing on the endpoint device based on the endpoint location and a time of the data communications.

DETAILED DESCRIPTION

Embodiments were conceived in light of the above mentioned needs, challenges and/or limitations, among other things. In general, some implementations may help provide wireless computer network security through location-based endpoint security.

Figure 1:
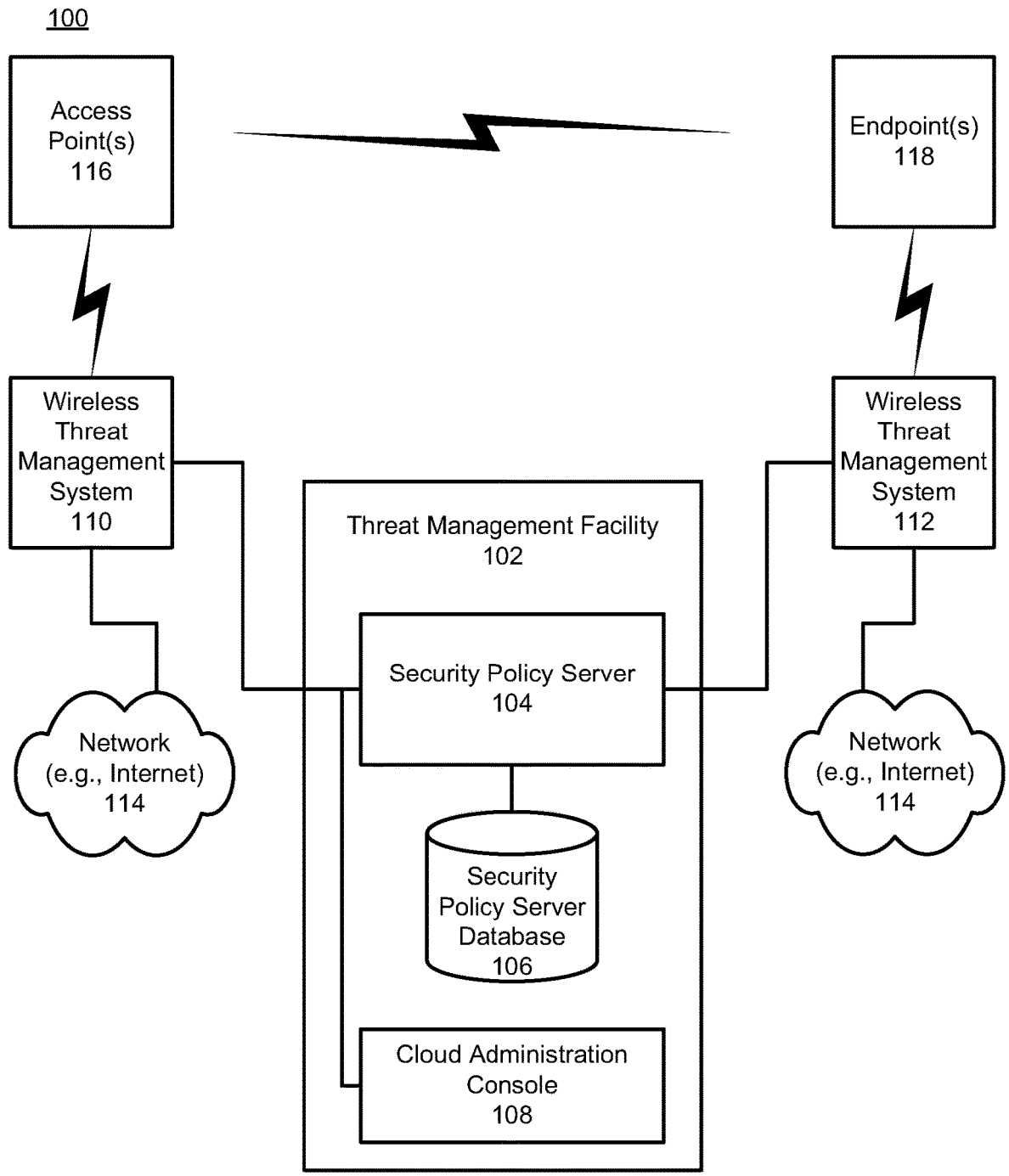
FIG. 1 is a diagram of an example location-based endpoint security environment including a system for location-based endpoint security rules and policies in accordance with some implementations.

FIG. 1 is a diagram of an example environment 100 in accordance with some implementations. The environment 100 includes a threat management facility or system 102 that includes a security policy server 104, a security policy server database 106, and a cloud administration console 108. The environment 100 also includes a wireless threat management system 110 serving as an intermediary system between one or more user endpoint devices 118 and a network 114 (e.g., the Internet). The environment 100 also includes one or more access points 116. The environment 100 also includes another wireless threat management system 112 (optional) serving an intermediary system between one or more endpoint devices 118 and the network 114. The endpoint devices 118 and access points 116 can be connected to a same wireless threat management system (e.g., 110).

In operation, the threat management system 102 can provide security policy provision and management according to one or more of the techniques described below in conjunction with FIGS. 2 and 3. For example, an endpoint device 118 can use location information (e.g., location of the endpoint device 118 and/or location information of one or more access points 116) to determine one or more security policies to be applied at the endpoint device to permit or restrict data communications according to a location-based endpoint security policy to help secure the user's network (e.g., endpoint devices 118, wireless threat management system 110, and the network 114 or other devices coupled to the network associated with the wireless threat management system 110).

The security policy or rule determined by the endpoint device 118 based on location information can be used at the endpoint device to help secure the endpoint device and/or can be sent to the security policy server 104 of the threat management system 102 and stored in the database 106.

Figure 2:
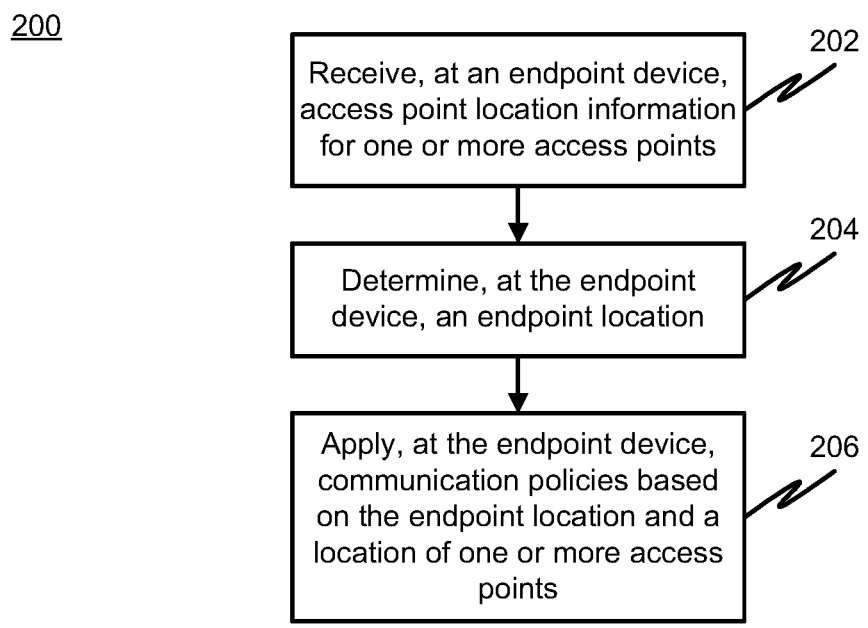
FIG. 2 is a flowchart showing an example method for location-based endpoint security in accordance with some implementations.

FIG. 2 is a flowchart showing an example method 200 for location-based endpoint security in accordance with some implementations. The method 200 may be performed by the endpoint device 118. The method begins at 202, where an endpoint device (e.g., endpoint device 118) receives access point location information for one or more access points (e.g., access point 116). In some implementations, the access point location information can include a latitude and longitude for respective ones of the one or more access points 116. The access point location information can be obtained from a floor map of a site or other map or layout of a site, building, building floor, or facility. The access point location information can be received from one or more of the access points 116 and/or from another system, such as a threat management facility or system (e.g., system 102 or facility 400 described below). Processing continues to 204.

At 204, the endpoint device 118 determines an endpoint location of the endpoint device 118 based on the access point location information and/or signal characteristics of wireless signals received by the endpoint device 118 from at least one of the one or more access points 116. In some implementations, determining the endpoint location can include performing a triangulation operation using the signal characteristics of the wireless signals. The endpoint location can also be determined based on location information received from a location device (e.g., a global positioning device within the endpoint device 118, another position sensing system based on wireless signals such as Bluetooth, Bluetooth low energy, radio frequency identification (RFID), position indicating beacons, near field communications, a position sensing device exterior to the endpoint device 118, etc.). In some implementations, determining the endpoint location can include determining a radio frequency fingerprint for one or more wireless signals received by the endpoint device 118. Processing continues to 206.

At 206, the endpoint device 118 applies one or more data communication policies based on the endpoint location and the access point location information. In some implementations the one or more data communications policies can include permitting one or more applications executing on the endpoint device 118 to perform data communications with at least one of the one or more access points 116. For example, if an endpoint is near an AP and location is in a meeting room or conference room, the policy can be applied to increase the priority of the voice/video traffic. In another example, another policy can include a policy to increase the airtime of the clients based on location. In another example, if the endpoint location is a classroom, a policy to be applied can include a policy to give priority to classroom applications and block all the other applications such as social networks, etc.

In some implementations, the one or more data communications policies can include restricting, using the endpoint device 118, one or more applications executing on the endpoint device 118 from performing data communications with at least one of the one or more access points 116. In some implementations, the one or more data communications policies can include selectively permitting data communications from one or more applications executing on the endpoint device 118 based on the endpoint location and a time of the data communications. Some examples of selectively permitting include: allowing only corporate applications to communicate when the location is in an office and during the working hours; blocking social network applications during the meeting time when the location is near the meeting room; and blocking bandwidth intensive applications during the peak hours.

In some implementations, communication policies can include one or more logic rules (e.g., stored in a database, a data file, a data record or the like). The one or more logic rules can specify how the endpoint device 118 is to process data communication requests based on one or more of endpoint location, application requesting data communications, and/or access point location. For example, a first data communication policy rule may specify that when an endpoint device 118 is at location A, application X is permitted to communicate data. A second example data communication policy rule may specify that when the endpoint device 118 is at location B, application X is not permitted to communicate data. The policies can be location-based and also based on the application requesting data communications. A data communication request can include an application attempting to transmit or receive data. By determining and applying the location-based security rules at the endpoint device 118, the endpoint device 118 itself helps maintain security, which can help reduce a processing burden of on a threat management server and increase the security and reduce unnecessary network traffic by applying location-based security policies within the endpoint device 118 prior to prevent data, which may not be permitted according to the security policies, from being communicated across the wireless network.

In some implementations, the method can also optionally include providing, by the endpoint device 118, the endpoint location to the one or more access points 116. For example, endpoint location information along with the time of connection can be used to apply policies on the endpoint. Policies can be applied at a network level (AP) or at an end point (end point agent).

Figure 3:
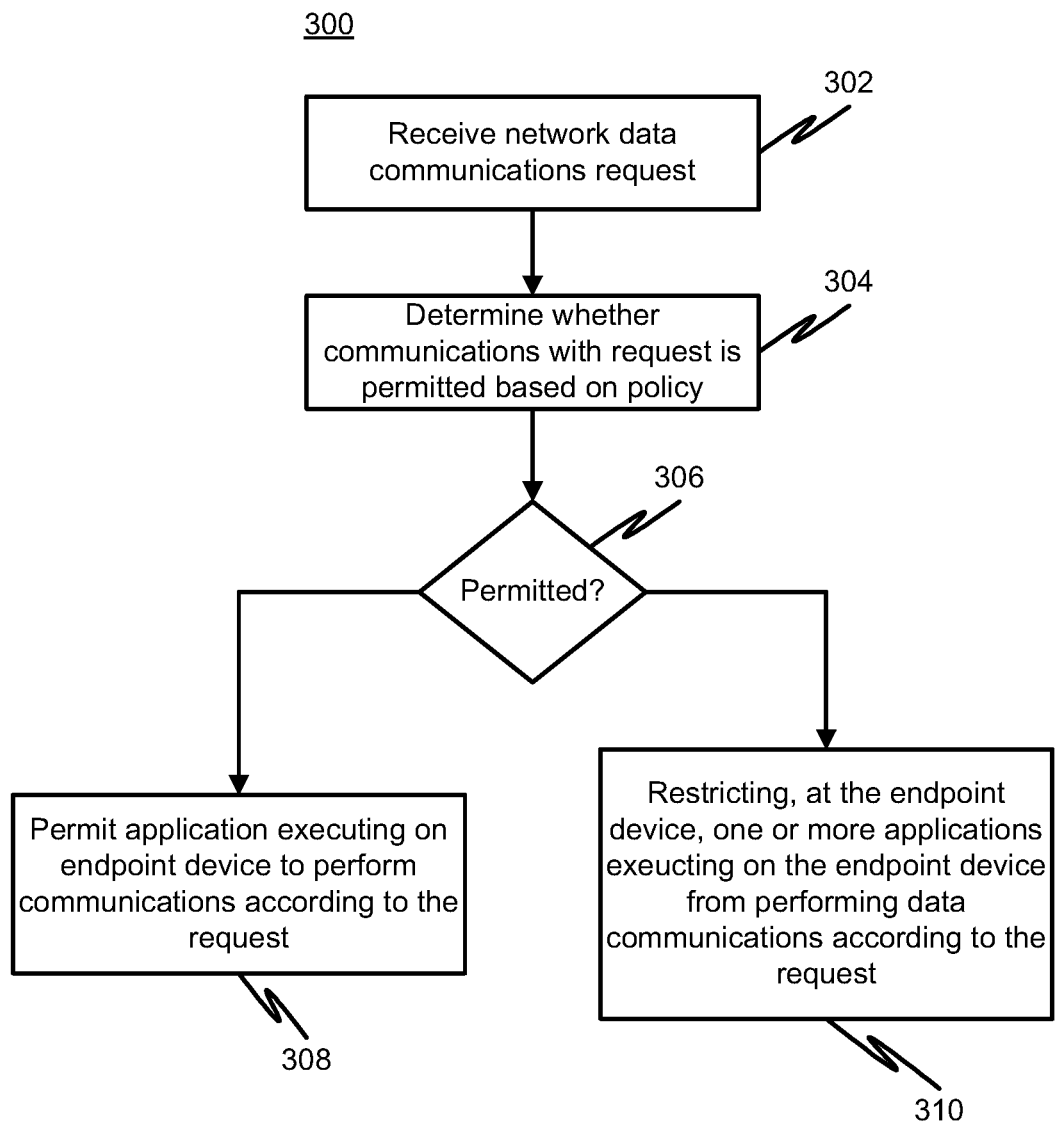
FIG. 3 is a flowchart showing an example method for location-based endpoint security in accordance with some implementations.

FIG. 3 is a flowchart showing an example method 300 for location-based endpoint security in accordance with some implementations. The method 300 may be performed by the endpoint device 118. Processing begins at 302 where a request for data communications is received or detected. For example, the request for data communications may be generated by an application program executing on an endpoint device 118. Processing continues to 304.

At 304, the endpoint device 118 determines whether the communication including within the received data communication request is permitted according to the location-based security policies in effect at the time the data communication request is received. Processing continues to 306.

At 306, if the communication is permitted, processing continues to 308, otherwise processing continues to 310.

At 308, the endpoint device 118 permits the data communications according to the received data communication request. For example, an application executing on the endpoint device 118 is permitted to perform the requested data communication operation.

At 310, the endpoint device 118 restricts the requested data communication and does not permit the data communication operation from being performed. For example, the endpoint device 118 can restrict an application program executing on the endpoint device 118 from performing the data communication operation contained in the received request.

Figure 4:
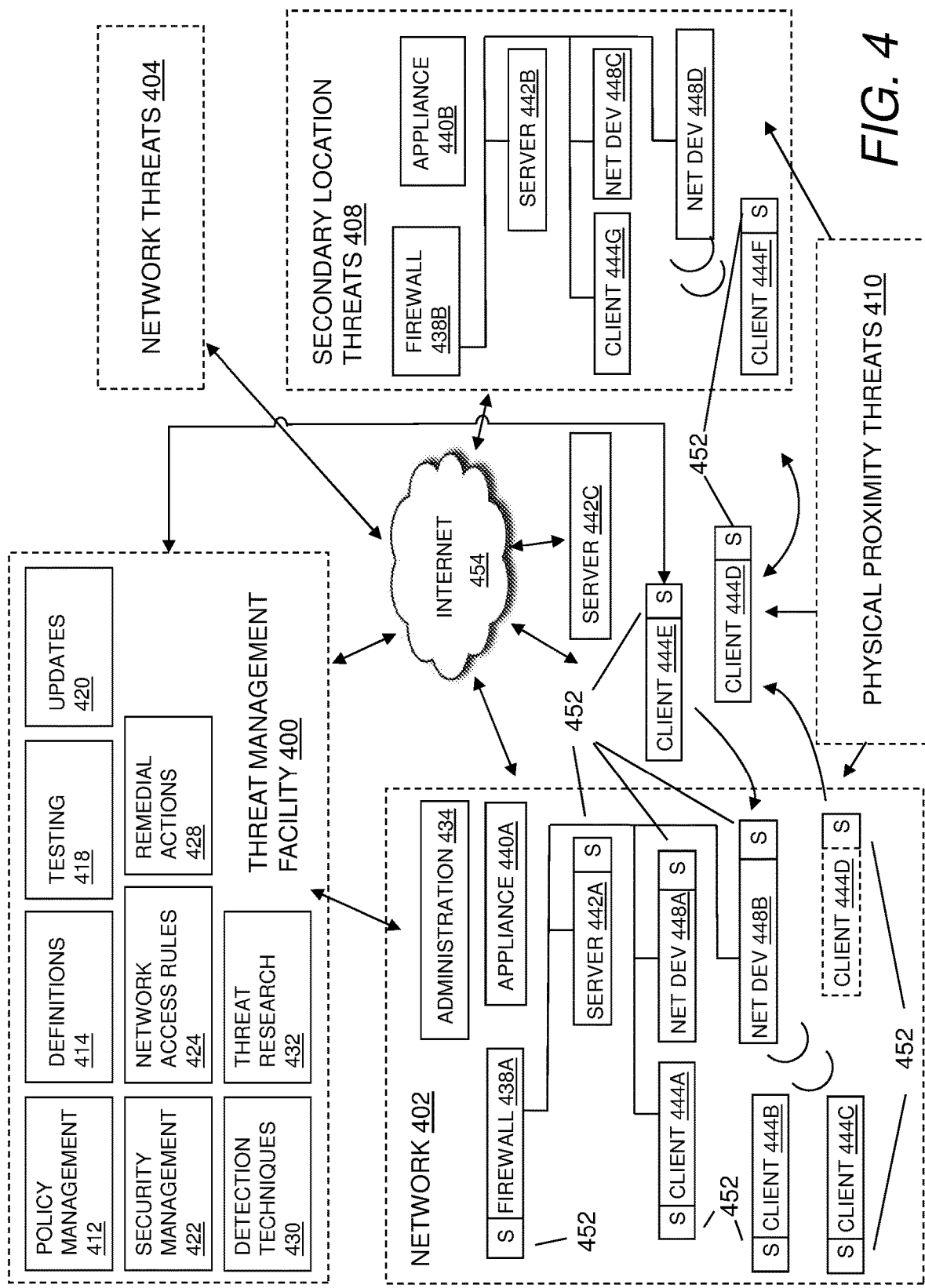
FIG. 4 is diagram of an example environment for threat management.

FIG. 4 illustrates an example environment for threat management including endpoint threat protection in accordance with some implementations. Specifically, FIG. 4 depicts a block diagram of a threat management facility 400 providing protection to one or more enterprises, networks, locations, users, businesses, etc. against a variety of threats-a context in which the techniques described above may usefully be deployed. The threat management facility 400 may be used to protect devices and assets (e.g., Internet of Things (IoT) devices or other devices) from computer-generated and human-generated threats. For example, a corporation, school, web site, homeowner, network administrator, or other entity may institute and enforce one or more policies that control or prevents certain network users (e.g. employees, residents, users, guests, etc.) from accessing certain types of applications, devices, resources generally or in a particular manner. Policies may be created, deployed and managed, for example, through the threat management facility 400, which may update and monitor network devices, users, and assets accordingly.

The threat of malware or other compromises may be present at various points within a network 402 such as laptops, desktops, servers, gateways, communication ports, handheld or mobile devices, IoT devices, firewalls. In addition to controlling or stopping malicious code, a threat management facility 400 may provide policy management to control devices, applications, or users that might otherwise undermine productivity and network performance within the network 402.

The threat management facility 400 may provide protection to network 402 from computer-based malware, including viruses, spyware, adware, Trojans, intrusion, spam, policy abuse, advanced persistent threats, uncontrolled access, and the like. In general, the network 402 may be any networked computer-based infrastructure or the like managed by the threat management facility 402, such as an organization, association, institution, or the like, or a cloud-based facility that is available for subscription by individuals. For example, the network 402 may be a corporate, commercial, educational, governmental, or other enterprise network, and may include multiple networks, computing resources, and other facilities, may be distributed among more than one geographical locations, and may include administration facility 434, a firewall 438A, an appliance 440A, a server 442A, network devices 448A-B, clients 444A-D, such as IoT devices or other devices. It will be understood that any reference herein to a client, endpoint, or client facilities may include the clients 444A-D shown in FIG. 4 and vice-versa.

The threat management facility 400 may include computers, software, or other computing facilities supporting a plurality of functions, such as security management facility 422, policy management facility 412, update facility 420, a definitions facility 414, network access rules facility 424, remedial action facility 428, detection techniques facility 430, testing facility 418, a threat research facility 432, and the like. In embodiments, the threat protection provided by the threat management facility 400 may extend beyond the network boundaries of the network 402 to include clients 444D (or client facilities) that have moved into network connectivity not directly associated with or controlled by the network 402. Threats to client facilities may come from a variety of sources, such as from network threats 404, physical proximity threats 410, secondary location threats 408, and the like. Clients 444A-D may be protected from threats even when the client 444A-D is not directly connected or in association with the network 402, such as when a client 444E-F moves in and out of the network 402, for example when interfacing with an unprotected server 442C through the Internet 454, when a client 444F is moving into a network where secondary location threat 408 is present (such as interfacing with components 440B, 442B, 448C, 448D that are not protected), and the like.

The threat management facility 400 may use or may be included in an integrated system approach to provide network 402 protection from a plurality of threats to device resources in a plurality of locations and network configurations. The threat management facility 400 may also or instead be deployed as a stand-alone solution. For example, some or all of the components of the threat management facility 400 may be integrated into a server or servers at a remote location, for example in a cloud computing facility. For example, some or all of the components of the threat management facility 400 may be integrated into a firewall, gateway, or access point within or at the border of the network 402. In some embodiments, the threat management facility 400 may be integrated into a product, such as a third-party product, e.g., through an application programming interface, which may be deployed on endpoints, on remote servers, on internal servers or gateways for a network, or some combination of these.

The security management facility 422 may include a plurality of elements that provide protection from malware to device resources of the network 402 in a variety of ways, including endpoint security and control, email security and control, web security and control, reputation-based filtering, control of unauthorized users, control of guest and non-compliant computers, and the like. The security management facility 422 may include a local software application that provides protection to one or more network 402 devices. The security management facility 422 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 422 may provide email security and control. The security management facility 422 may also or instead provide for web security and control, such as by helping to detect or block viruses, spyware, malware, unwanted applications, and the like, or by helping to control web browsing activity originating from client devices. In an embodiment, the security management facility 422 may provide for network access control, which may provide control over network connections. In addition, network access control may control access to virtual private networks (VPN) that provide communications networks tunneled through other networks. The security management facility 422 may provide host intrusion prevention through behavioral based protection, which may guard against known or unknown threats by analyzing behavior before or while code executes. The security management facility 422 may provide reputation filtering, which may target or identify sources of code.

In embodiments, the security management facility 422 (or endpoint threat protection 520 described below with respect to FIG. 5) may provide location-based endpoint security in the wireless network (e.g., according to the methods described above regarding FIGS. 2 and 3). This aspect of the security management facility 422 may also take place on the firewall 438A (e.g., an access point), appliance 440A, or within client (or endpoint) devices (e.g., one or more of clients 444A-444E).

In general, the security management facility 422 may support overall security of the network 402 using the various techniques described above, optionally as supplemented by updates of malicious code information and so forth for distribution across the network 402.

The administration facility 434 may provide control over the security management facility 422 when updates are performed. Information from the security management facility 422 may also be sent from the enterprise back to a third party, a vendor, or the like, which may lead to improved performance of the threat management facility 400.

The threat management facility 400 may include policy management facility 412 configured to take actions, such as to block applications, users, communications, devices, and so on based on determinations made. The policy management facility 412 may employ a set of rules or policies that determine access permissions to the network 402 for a client 444. In an embodiment, a policy database may include a block list, a black list, an allowed list, a white list, or the like, or combinations of the foregoing, that may provide a list of resources internal or external to the network 402 that may or may not be accessed by client devices 444. The policy management facility 412 may also or instead include rule-based filtering of access requests or resource requests, or other suitable techniques for controlling access to resources consistent with a corresponding policy.

In some embodiments, the policy management facility 412 may include or be part of a security policy server (e.g., server 104 described above). The policy management facility 412 may include policies to permit or deny access, to take remedial action, to issue alerts, and so on based on particular reliability index determinations.

The policy management facility 412 may also or instead provide configuration policies to be used to compare and control the configuration of applications, operating systems, hardware, devices, and/or a network associated with the network 402. An evolving threat environment may dictate timely updates, and thus an update facility 420 may also be provided by the threat management facility 400. In addition, the policy management facility 412 may require update management (e.g., as provided by the update facility 420 herein described). In some embodiments, the update facility 420 may provide for patch management or other software updating, version control, and so forth.

The security management facility 422 and policy management facility 412 may push information to the network 402 and/or a given client 444. The network 402 and/or client 444 may also or instead request information from the security facility 422 and/or policy management facility 412, network server 442, or there may be a combination of pushing and pulling of information. In an embodiment, management update modules of the policy management facility 412 and the security management facility 422 may work in concert to provide information to the network 402 and/or a facility of client 444 for control of applications, devices, users, and so on.

As threats are identified and characterized, the threat management facility 400 may create updates that may be used to allow the threat management facility 400 to detect and remediate malicious software, unwanted applications, configuration and policy changes, and the like. The threat definition facility 414 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 422 when scanning files or applications within the client facility for the determination of malicious code that may be within the file or application. A definition management facility may include a definition for a neural network or other recognition engine. A definition management facility 414 may provide timely updates of definition files information to the network, client facilities, and the like.

The security management facility 422 may be used to scan an outgoing file and verify that the outgoing file is permitted to be transmitted per rules and policies of the enterprise facility 402. By checking outgoing files, the security management facility 422 may be able to discover malicious code infected files that were not detected as incoming files.

The threat management facility 400 may provide controlled access to the network 402. The network access rules facility 424 may be responsible for determining if an application or other facility of a client 444 should be granted access to a requested network resource. In an embodiment, the network access rules facility 424 may verify access rights for facilities of the client 444 to or from the network 402 or may verify access rights of computer facilities to or from external networks. When network access for a client facility is denied, the network access rules facility 424 may send an information file to the client facility, e.g., a command or command file that the remedial action facility 428 may access and take action upon. The network access rules facility 424 may include one or more databases that may include a block list, a black list, an allowed list, a white list, a reputation list, an unacceptable network resource database, an acceptable network resource database, a network resource reputation database, or the like. The network access rules facility 424 may incorporate rule evaluation. Rule evaluation may, for example, parse network access requests and apply the parsed information to network access rules. The network access rule facility 424 may also or instead provide updated rules and policies to the network 402.

When a threat or policy violation is detected by the threat management facility 400, the threat management facility 400 may perform or initiate remedial action through a remedial action facility 428. Remedial action may take a variety of forms, such as terminating or modifying an ongoing process or interaction, issuing an alert, sending a warning to a client or administration facility 434 of an ongoing process or interaction, executing a program or application to remediate against a threat or violation, recording interactions for subsequent evaluation, and so forth. The remedial action may include one or more of blocking some or all requests to a network location or resource, performing a malicious code scan on a device or application, performing a malicious code scan on the client 444, quarantining a related application (or files, processes or the like), terminating the application or device, isolating the application or device, moving a process or application code to a sandbox for evaluation, isolating a facility of the client 444 to a location or status within the network that restricts network access, blocking a network access port from a facility of the client 444, reporting the application to an administration facility 434, or the like, as well as any combination of the foregoing.

Remedial action may be provided as a result of a detection of a threat or violation. The detection techniques facility 430 may include tools for monitoring the network or managed devices within the network 402. The detection techniques facility 430 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 400 detects threats and violations to established policy, may involve the ability to test the system, either at the system level or for a particular computing component. The testing facility 418 may allow the administration facility 434 to coordinate the testing of the security configurations of client facility computing facilities on a network. For example, the administration facility 434 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 434. The administration facility 434 may be able to determine the level of preparedness of the client 444 based on the reported information. Remedial action may be taken for any of the facilities of the client 444 as determined by the administration facility 434.

The threat management facility 400 may provide threat protection across the network 402 to devices such as clients 444, server 442, administration facility 434, firewall 438, a gateway, one or more network devices 448 (e.g., hubs and routers), a threat management or other appliance 440, any number of desktop or mobile users, and the like. As used herein the term endpoint may refer to any computing instance running on a device that can source data, receive data, evaluate data, buffer data, process data or the like (such as a user's desktop computer, laptop, IoT device, server, etc.). This may, for example, include any client devices as well as other network devices and the like within the network 402, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 402. An endpoint computer security facility 452 may be an application locally loaded onto any corresponding computer platform or computer support component, either for local security functions or for management by the threat management facility 400 or other remote resource, or any combination of these.

The network 402 may include a plurality of client facility computing platforms on which the endpoint computer security facility 452 is installed. A client facility computing platform may be a computer system that is able to access a service on another computer, such as a server 442, via a network. The endpoint computer security facility 452 may, in corresponding manner, provide security in any suitable context such as among a plurality of networked applications, for a client facility connecting to an application server 442, for a web browser client facility connecting to a web server 442, for an e-mail client facility retrieving e-mail from an Internet 454, service provider's mail storage servers 442, or web site, and the like, as well as any variations or combinations of the foregoing.

The network 402 may include one or more of a variety of servers 442, such as application servers, communications servers, file servers, database servers, proxy servers, mail servers, fax servers, game servers, web servers, and the like. A facility of the server 442, which may also be referred to as a server facility 442 application, server facility 442 operating system, server facility 442 computer, or the like, may be any device(s), application program(s), operating system(s), or combination of the foregoing that accepts client facility connections in order to service requests from clients 444. In embodiments, the threat management facility 400 may provide threat protection to server facilities 442 within the network 402 as load conditions and application changes are made.

A server facility 442 may include an appliance facility 440, where the appliance facility 440 provides specific services to other devices on the network. Simple server facility 442 appliances may also be utilized across the network 402 infrastructure, such as switches, routers, hubs, gateways, print servers, modems, and the like. These appliances may provide interconnection services within the network 402, and therefore may advance the spread of a threat if not properly protected.

A facility of the client 444 may be protected from threats from within the network 402 using a local or personal firewall, which may be a hardware firewall, software firewall, or combination, that controls network traffic to and from a client. The local firewall may permit or deny communications based on a security policy. Another component that may be protected by an endpoint computer security facility 452 is a network firewall facility 438, which may include hardware or software, in a standalone device or integrated with another network component, that may be configured to permit, deny, or proxy data through a network 402.

The interface between the threat management facility 400 and the network 402, and through the appliance facility 440 to embedded endpoint computer security facilities, may include a set of tools that may be the same or different for various implementations, and may allow each network administrator to implement custom controls. In embodiments, these controls may include both automatic actions and managed actions. The administration facility 434 may configure policy rules that determine interactions. The administration facility 434 may also establish license management, which in turn may further determine interactions associated with licensed applications. In embodiments, interactions between the threat management facility 400 and the network 402 may provide threat protection to the network 402 by managing the flow of network data into and out of the network 402 through automatic actions that may be configured by the threat management facility 400 for example by action or configuration of the administration facility 434.

Clients 444 within the network 402 may be connected to the network 402 by way of wired network facilities or wireless network facilities provided by network device(s) 448. Mobile wireless facility clients 444, because of their ability to connect to a wireless network access point, may connect to the Internet 454 outside the physical boundary of the network 402, and therefore outside the threat-protected environment of the network 402. Such a client 444, if not for the presence of a locally-installed endpoint computer security facility 452, may be exposed to a malware attack or perform actions counter to network 402 policies. Thus, the endpoint computer security facility 452 may provide local protection against various threats and policy violations. The threat management facility 400 may also or instead be configured to protect the out-of-enterprise facility 402 mobile client facility (e.g., the clients 444) through interactions over the Internet 454 (or other network) with the locally-installed endpoint computer security facility 452. Thus mobile client facilities that are components of the network 402 but temporarily outside connectivity with the network 402 may be provided with the threat protection and policy control the same as or similar to clients 444 inside the network 402. In addition, mobile clients 444 may receive the same interactions to and from the threat management facility 400 as clients 444 inside the network 402, such as by receiving the same or equivalent services via an embedded endpoint computer security facility 452.

Interactions between the threat management facility 400 and the components of the network 402, including mobile client facility extensions of the network 402, may ultimately be connected through the Internet 454 or any other network or combination of networks. Security-related or policy-related downloads and upgrades to the network 402 may be passed from the threat management facility 400 through to components of the network 402 equipped with the endpoint computer security facility 452. In turn, the endpoint computer security facility 452 components of the enterprise facility 102 may upload policy and access requests back across the Internet 454 and through to the threat management facility 400. The Internet 454, however, is also the path through which threats may be transmitted from their source, and an endpoint computer security facility 452 may be configured to protect a device outside the network 402 through locally-deployed protective measures and through suitable interactions with the threat management facility 400.

Thus, if the mobile client facility were to attempt to connect into an unprotected connection point, such as at a secondary location (having secondary location threats 408) that is not a part of the network 402, the mobile client facility 444 may be required to request network interactions through the threat management facility 400, where contacting the threat management facility 400 may be performed prior to any other network action. In embodiments, the client's 444 endpoint computer security facility 452 may manage actions in unprotected network environments such as when the client (e.g., client 444F) is in a secondary location 408, where the endpoint computer security facility 452 may dictate what applications, actions, resources, users, etc. are allowed, blocked, modified, or the like.

The secondary location 408 may have no endpoint computer security facilities 452 as a part of its components, such as its firewalls 438B, servers 442B, clients 444G, hubs and routers 448C-D, and the like. As a result, the components of the secondary location 408 may be open to threat attacks, and become potential sources of threats, as well as any mobile enterprise facility clients 444B-F that may be connected to the secondary location's 408 network. In this instance, these components may now unknowingly spread a threat to other connected to the network 402.

Some threats do not come directly from the Internet 454. For example, a physical proximity threat 410 may be deployed on a client device while that device is connected to an unprotected network connection outside the network 402, and when the device is subsequently connected to a client 444 on the network 402, the device can deploy the malware or otherwise pose a threat. In embodiments, the endpoint computer security facility 452 may protect the network 402 against these types of physical proximity threats 410, for instance, through scanning any device prior to allowing data transfers, through security validation certificates, through establishing a safe zone within the network 402 to receive data for evaluation, and the like.

Figure 5:
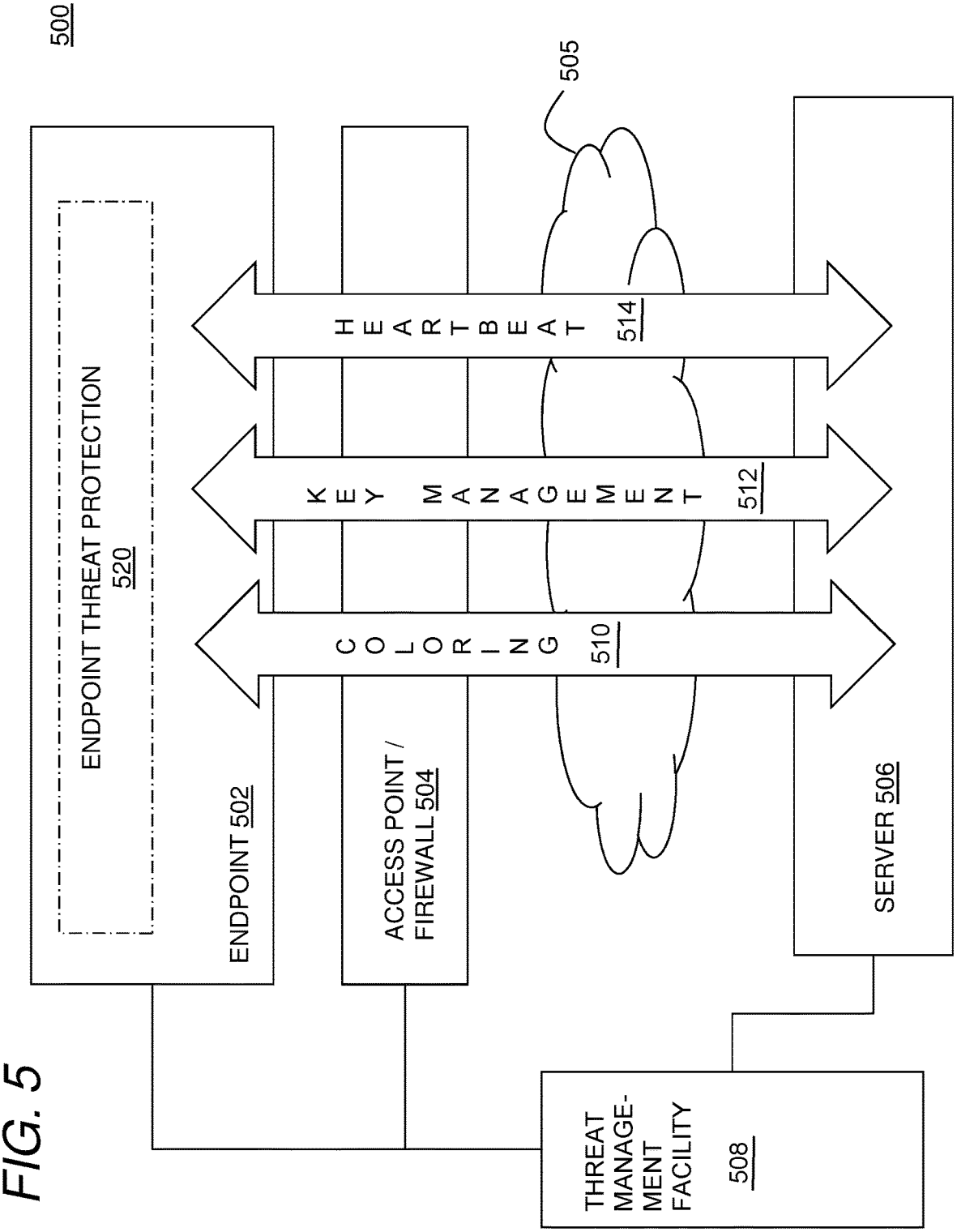
FIG. 5 is a diagram of an example threat management system including endpoint threat protection in accordance with some implementations.

FIG. 5 illustrates an example threat management system 500 including endpoint threat protection as contemplated herein. In general, the threat management system may include an endpoint 502 for example, a laptop, or a device such as an IoT device, an access point 504, a server 506 and a threat management facility 508 in communication with one another directly or indirectly through a data network 505, for example, as generally described above. Each of the entities depicted in FIG. 5, may, for example, be implemented on one or more computing devices such as the computing device described with reference to FIG. 6 below.

A number of systems may be distributed across these various components to support threat management, for example, including a coloring system 510, a key management system 512, and a heartbeat system 514, each of which may include software components executing on any of the foregoing system components, and each of which may communicate with the threat management facility 508 or an endpoint threat protection agent 520 executing on the endpoint 502, on the access point or firewall 504, or on the server 506 to support improved threat detection and remediation.

The coloring system 510 may be used to label or 'color' software objects for improved tracking and detection of potentially harmful activity. The coloring system 510 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 512 may support management of keys for the endpoint 502 in order to selectively permit or prevent access to content on the endpoint 502 on a file-specific basis, a process-specific basis, an application-specific basis, a user-specific basis, or any other suitable basis in order to prevent data leakage, and in order to support more fine-grained and immediate control over access to content on the endpoint 502 when a security compromise is detected. Thus for example, if a particular process executing on the endpoint is compromised, or potentially compromised or otherwise under suspicion, keys to that process may be revoked in order to prevent, e.g., data leakage or other malicious activity. In embodiments, keys on device may be revoked based on one or more reliability index values, the meeting of one or more reliability index thresholds, the rate of change of one or more reliability index values, etc.

The heartbeat system 514 may be used to provide periodic or aperiodic information from an endpoint about system health, security, status, etc. A heartbeat may be encrypted or plaintext, or some combination of these, and may be communicated unidirectionally (e.g., from the endpoint 502 to the threat management facility 508) or bidirectionally (e.g., between the endpoint 502 and the server 506, or any other pair of system components) on a useful schedule.

In implementations, the access point or firewall 504 may use the heartbeat 514 to report a potential or actual compromise of a device based, for example, on a color of the device, or based on one or more reliability index values, the meeting of one or more reliability index thresholds, the rate of change of one or more reliability index values, etc. The heartbeat 514 from the access point 504 may be communicated to a server 506, for example, and administrative server or directly or indirectly to a threat management facility 508. If the endpoint device 502 has an endpoint threat protection facility 520, the facility 520 may be used to further investigate the status, or to take remedial measures, again by communication using the secure heartbeat 514.

In general, these various monitoring and management systems may cooperate to provide improved threat detection and response. For example, the coloring system 510 may be used to evaluate when a particular device is potentially compromised, and a potential threat may be confirmed based on an interrupted heartbeat from the heartbeat system 514. The key management system 512 may then be used to revoke keys to a process so that no further files can be opened, deleted or otherwise modified. More generally, the cooperation of these systems enables a wide variety of reactive measures that can improve detection and remediation of potential threats to an endpoint.

In some implementations, the coloring 510 and/or the heartbeat 514 may be used to assign a device to a VLAN. In some implementations, information about the status of the device, for example, health status, may be provided by a security module, and the status of the device may be used to assign the device to VLAN. For example, the endpoint threat detection 520 may monitor the device. A change in health status as reported by the threat detection 520 may be used to request that an access point 502 assign or reassign a device to a VLAN. For example, a device that meets security requirements may continue to use or may be assigned to a particular VLAN and a device that has one or more flagged security issues, such as software that is not up to date, a modified operating system, identified malware, etc., may be assigned or reassigned to another VLAN. The heartbeat 514 may be used as a secure communication channel to report the status of the endpoint.

In some implementations, the access point 504 may receive status information from the endpoint, and assign or reassign the endpoint 502 to the VLAN based on the status information. In some implementations, the server 506 or the threat management facility 508 may receive information about the endpoint 502 and direct the wireless access point to assign or re-assign the endpoint 502 to a VLAN. In some implementations, the threat management facility 508 may direct the endpoint 502 to a VLAN without the cooperation of the access point, or by notifying the access point 504 and the endpoint 502 of the change at the same time.

In some implementations, in connection with the assignment or reassignment of an endpoint 502 to a VLAN, the threat management facility 508 or the server 506 provides an authentication credential to the endpoint 502, which the endpoint can, in turn, present to the access point 504 for VLAN access.

In some implementations, an access point or firewall 504 may color the endpoint 502 based at least in part on activity or behavior of the endpoint 502. The coloring may be used by the access point or firewall 504 to assign or reassign the endpoint to VLAN. For example, if a color that indicates a potential compromise is assigned to the endpoint 502, the endpoint may be assigned or reassigned to a VLAN. Likewise, the assignment to a VLAN may be used as a color to consider the behavior of the VLAN in context.

Figure 6:
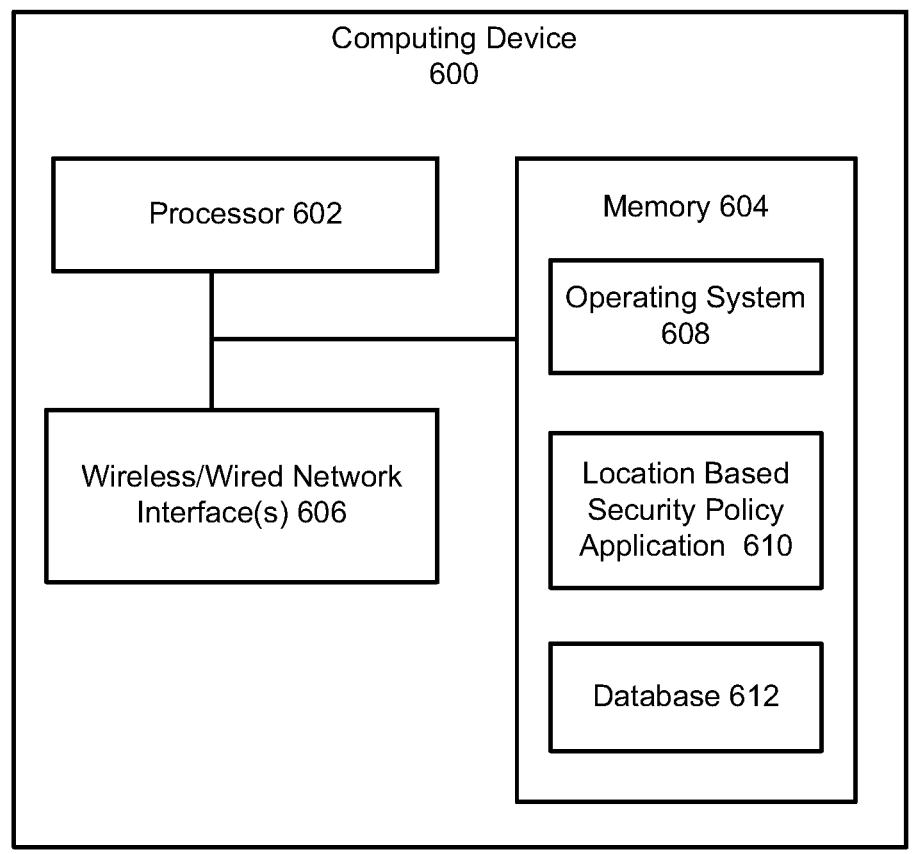
FIG. 6 is a diagram of an example computing device configured for location-based endpoint security in accordance with at least one implementation.

FIG. 6 is a diagram of an example computing device 600 in accordance with at least one implementation. The computing device 600 includes one or more processors 602, nontransitory computer readable medium or memory 604, I/O interface devices 606 (e.g., wireless communications, etc.), and a network interface 608, all of which may be operatively coupled to each other by a bus. The computer readable medium 604 may have stored thereon an operating system 608, a location-based security policy application 610 for providing and managing security policies at an endpoint based on location information (e.g., location of the endpoint and/or location of one or more access points), and a database 612 (e.g., for storing security policies, location information for the endpoint and/or access points, etc.).

In operation, the processor 602 may execute the application 610 stored in the computer readable medium 604. The application 610 may include software instructions that, when executed by the processor, cause the processor to perform operations for location-based endpoint security in accordance with the present disclosure (e.g., performing one or more of the operations described in one or more of FIGS. 2 and/or 3).

The application program 610 may operate in conjunction with the database 612 and the operating system 608. The device 600 may communicate with other devices (e.g., a wireless access point) via the I/O interfaces 606.

It will be appreciated that one or more of 202-206 or 302-310 may be repeated, performed in a different order or performed periodically.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for providing and managing security rules and policies.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

We claim:

1. A computer-implemented method, comprising:
   receiving, at an endpoint device, access point location information for one or more access points;
   determining, at the endpoint device, an endpoint location of the endpoint device based on the access point location information and signal characteristics of wireless signals received by the endpoint device from at least one of the one or more access points, wherein determining the endpoint location includes determining a radio frequency fingerprint for the wireless signals received by the endpoint device;
   receiving, at the endpoint device, a request for data communication from an application that executes on the endpoint device;
   applying, at the endpoint device, one or more data communication policies for the data communication with the at least one of the one or more access points based on the endpoint location; and
   selectively permitting the data communication from the application that executes on the endpoint device, based on the endpoint location and the one or more data communication policies, wherein the data communication by the application is permitted when the endpoint location is a first location and is not permitted when the endpoint location is a second location different from the first location.

2. The computer-implemented method of claim 1, further comprising providing, by the endpoint device, the endpoint location to the one or more access points.

3. The computer-implemented method of claim 1, wherein the access point location information includes a latitude and longitude for respective ones of the one or more access points.

4. The computer-implemented method of claim 1, wherein determining the endpoint location includes performing a triangulation operation using the signal characteristics of the wireless signals.

5. A threat management system, comprising:
   one or more processors; and
   a nontransitory computer readable medium coupled to the one or more processors, wherein the nontransitory computer readable medium has stored thereon software instructions that, when executed by the one or more processors, causes the one or more processors to perform operations including:
   receiving, at an endpoint device, access point location information for one or more access points;
   determining, at the endpoint device, an endpoint location of the endpoint device based on the access point location information and signal characteristics of wireless signals received by the endpoint device from at least one of the one or more access points, wherein determining the endpoint location includes determining a radio frequency fingerprint for the wireless signals received by the endpoint device;
   receiving, at the endpoint device, a request for data communication from an application that executes on the endpoint device;
   applying, at the endpoint device, one or more data communication policies for the data communication with the at least one of the one or more access points based on the endpoint location; and
   selectively permitting the data communication from the application that executes on the endpoint device, based on the endpoint location and the one or more data communication policies, wherein the data communication by the application is permitted when the endpoint location is a first location and is not permitted when the endpoint location is a second location different from the first location.

6. The system of claim 5, wherein the operations further comprise providing, by the endpoint device, the endpoint location to the one or more access points.

7. The system of claim 5, wherein the access point location information includes a latitude and longitude for respective ones of the one or more access points.

8. The system of claim 5, wherein determining the endpoint location includes performing a triangulation operation using the signal characteristics of the wireless signals.

9. A nontransitory computer readable medium having stored thereon software instructions that, when executed by one or more processors, causes the one or more processors to perform operations including:
   receiving, at an endpoint device, access point location information for one or more access points;
   determining, at the endpoint device, an endpoint location of the endpoint device based on the access point location information and signal characteristics of wireless signals received by the endpoint device from at least one of the one or more access points, wherein determining the endpoint location includes determining a radio frequency fingerprint for the wireless signals received by the endpoint device;
   receiving, at the endpoint device, a request for data communication from an application that executes on the endpoint device;
   applying, at the endpoint device, one or more data communication policies for the data communication with the at least one of the one or more access points based on the endpoint location; and
   selectively permitting the data communication from the application that executes on the endpoint device, based on the endpoint location and the one or more data communication policies, wherein the data communication by the application is permitted when the endpoint location is a first location and is not permitted when the endpoint location is a second location different from the first location.

10. The nontransitory computer readable medium of claim 9, wherein the operations further comprise providing, by the endpoint device, the endpoint location to the one or more access points.

11. The computer-implemented method of claim 1, wherein selectively permitting data communication from the application further comprises selectively permitting the data communication from the application based on a time of the data communication.

12. The computer-implemented method of claim 11, wherein the endpoint location is in an office, the time of data communication is during working hours, and selectively permitting the data communication comprises allowing only corporate applications to perform the data communication.

13. The computer-implemented method of claim 11, wherein the endpoint location is near a meeting room, the time of data communication is during a meeting time, and selectively permitting the data communication comprises blocking social network applications from performing the data communication.

14. The system of claim 5, wherein selectively permitting data communication from the application further comprises selectively permitting the data communication from the application based on a time of the data communication.

15. The system of claim 14, wherein the endpoint location is in an office, the time of data communication is during working hours, and selectively permitting the data communication comprises allowing only corporate applications to perform the data communication.

16. The system of claim 14, wherein the endpoint location is near a meeting room, the time of data communication is during a meeting time, and selectively permitting the data communication comprises blocking social network applications from performing the data communication.

17. The nontransitory computer readable medium of claim 9, wherein selectively permitting data communication from the application further comprises selectively permitting the data communication from the application based on a time of the data communication.

18. The nontransitory computer readable medium of claim 17, wherein the endpoint location is in an office, the time of data communication is during working hours, and selectively permitting data communication comprises allowing only corporate applications to perform the data communication.

* * * * *